3,403,149
PRODUCTION OF CYANINE DYES
Geoffrey Ernest Ficken, Ilford, England, assignor to Ilford Limited, Ilford, England, a British company
No Drawing. Continuation-in-part of application Ser. No. 171,598, Feb. 7, 1962. This application May 6, 1964, Ser. No. 365,481
Claims priority, application Great Britain, May 17, 1963, 19,754/63
2 Claims. (Cl. 260—240.1)

ABSTRACT OF THE DISCLOSURE

There is provided a process for the production of cyanine dyes having the formula:

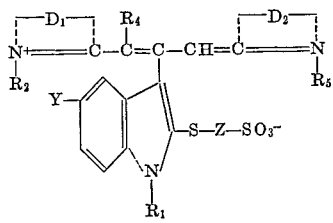

wherein $R_1$ is selected from the class consisting of methyl and phenyl groups, $R_2$ and $R_5$ are each selected from the class consisting of methyl and ethyl, $R_4$ is selected from the class consisting of hydrogen and methyl groups, Y is selected from the class consisting of hydrogen and methoxy groups, Z is a saturated alkylene group of 3 to 5 carbon atoms linking the indicated sulphur atoms, and $D_1$ and $D_2$ are each a residue selected from the residues of thiazoles, benzthiazoles, benzoxazoles, benzselenazole, naphthathiazoles and indoles, which comprises fusing a compound of the formula:

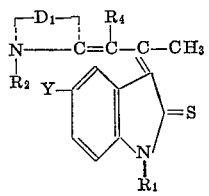

with a theoretical excess of a compound of formula:

and a compound of formula:

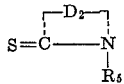

wherein the symbols have the meanings just assigned and refluxing the product in the presence of a tertiary amine.

---

This application is a continuation-in-part of U.S. application No. 171,598, filed Feb. 7, 1962, now Patent No. 3,164,586.

This invention relates to the production of cyanine dyes and is an improvement in or modification of the invention described in U.S. patent application No. 171,598, now Patent No. 3,164,586.

U.S. patent application No. 171,598, now Patent No. 3,164,586, described inter alia cyanine dyes of the Formula I:

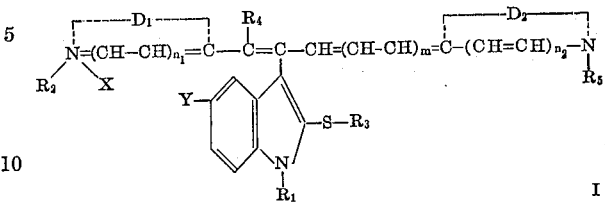

wherein $R_1$ is an alkyl or aryl group,
$R_3$ is an alkyl group containing 2 to 6 carbon atoms and further containing a sulphonic acid group,
$R_2$ and $R_5$ are each an alkyl, hydroxyalkyl or aralkyl group,
$R_4$ is hydrogen or an alkyl group,
$n_1$, $n_2$ and $m$ are each nought or one,
X is an acid radical,
Y is hydrogen or an alkoxy group, and
$D_1$ and $D_2$ are each the residue of a five-membered or six-membered heterocyclic nitrogen nucleus.

The group $R_3$ may be alternatively represented as $-Z-SO_3H$ where Z is a saturated alkylene group of 2 to 6 carbon atoms linking the two sulphur atoms.

These dyes exist in the switterionic form of Formula II:

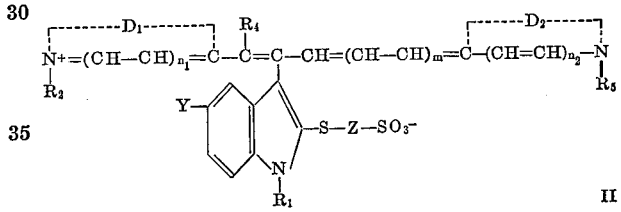

According to the present invention there is provided a process for the production of dyes of Formula II which comprises
(a) reacting a compound of Formula III:

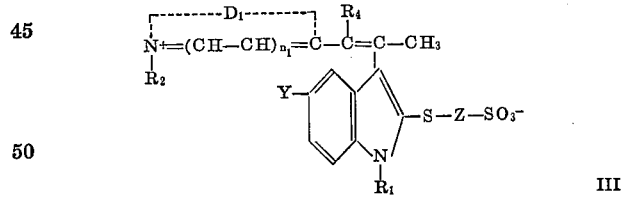

with a compound of Formula IV:

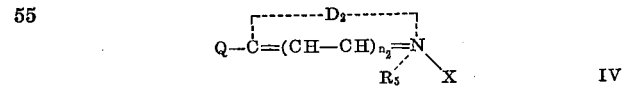

where Q is a thioether, thioethervinyl or acetanilidovinyl group, in the presence of a basic condensing agent.

The intermediate of Formula III may be obtained by reacting a compound of Formula V:

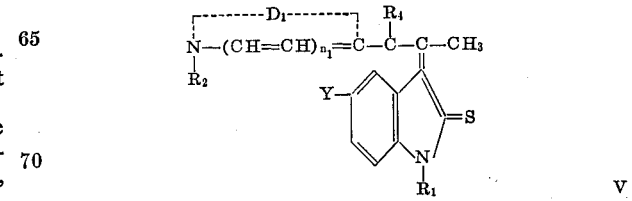

with an alkane sultone of the Formula VI:

where Z is a saturated alkylene group containing 2 to 6 carbon atoms in the chain linking the oxygen and sulphur atoms, e.g. propane sultone or butane sultone.

or (b) a compound of Formula V is fused with a theoretical excess of a compound of Formula VI and a compound of Formula VII:

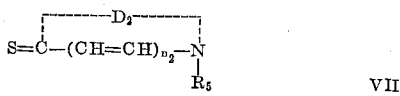

or (c) a compound of Formula VII is fused with excess of a compound of Formula VI and with a compound of Formula VIII:

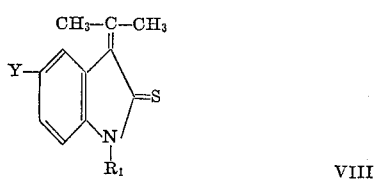

Method (c) leads to a symmetrical dye.

In the foregoing formulae the alkyl groups are preferably methyl, ethyl, propyl or butyl, suitable hydroxyalkyl groups are β-hydroxyethyl, γ-hydroxypropyl and βγ-dihydroxypropyl, and a suitable aralkyl group is benzyl.

$D_1$ and $D_2$ may each be the residue of any five-membered or six-membered heterocyclic ring system including thiazoles, oxazoles, selenazoles and their polycyclic homologues such as those of the benzene and naphthalene series; pyridine and its polycyclic homologues, such as quinoline and α- and β-naphthoquinolines; indolenines; diazoles (e.g. 1:3:4-thiadiazole); thiazolines; diazines (e.g. pyrimidines and quinazolines). The polycyclic compounds of the series may be substituted in the carboxylic rings with one or more groups such as alkyl, aryl, alkoxy and methylene dioxy groups, or by halogen atoms.

X may be any acid radical, for example halide (chloride, bromide, iodide), sulphate, sulphamate, perchlorate or p-toluene sulphonate.

The foregoing compounds of Formula II are valuable sensitisers for photographic silver halide emulsions and may be used in that connection in quantities similar to, and by methods similar to, those well known in the art for the sensitising of photographic emulsions with cyanine dyes.

The following examples will serve to illustrate the invention:

Example 1.—Anhydro-bis-(3-methyl-5-phenyl-2-benzoxazole)-β-(1-methyl-2-3′-sulphopropylthio-3-indolyl) - trimethincyanine hydroxide A mixture of 3-isopropylidene-1-methyl-2-thioindoline (1.0 g.), 3-methyl-5-phenyl-2-thiobenzoxazoline (4.8 g.), and 1,3-propanesultone (5.0 g.) was fused at 140–145° C. for 2 hours. The melt was refluxed with pyridine (20 ml.) for 1 hour and the resulting solution plus solid was stirred with dilute aqueous ammonia. The solid was collected, was washed successively with water, benzene and ether, was dried and chromatographed on alumina in chloroform solution. The eluate from the main red band was evaporated to small volume and ether was added to precipitate a solid. This was collected and crystallised twice from methanol to yield the dye as red crystals, M.P. 264–266° C. (decomp.).

The dye extends the sensitivity of a silver iodobromide photographic emulsion to 5850 A. with a maximum at 5600 A.

Example 2.—Anhydro-(3-methyl - 2 - benzothiazole) (6-methoxy-3-methyl-2-benzothiazole)-β-(1-methyl-2 - 3′-sulphopropylthio-3-indolyl) - trimethincyanine hydroxide A mixture of 3-methyl-2-[2-(1-methyl-2-thio-3 - indolinylidene)-propylidene]-benzothiazoline (0.35 g.), 1,3-propanesultone (1.0 g.) and chloroform (20 ml.) was refluxed for 1 hour, the solvent was distilled off, and the residue was washed several times with dry ether. This product was refluxed for 25 minutes with 6-methoxy-3-methyl-2-methylthiobenzothiazolium toluene-p-sulphonate (0.8 g.) in ethanol (10 ml.) containing triethylamine (0.5 ml.). Addition of a little concentrated aqueous ammonia to the cooled solution caused the separation of a solid, which was collected and washed successively with ethanol and boiling benzene. After boiling out with methanol, the dye formed green crystals, M.P. 316–317° C. (decomp.).

Example 3.—Anhydro-bis-(3,6-dimethyl-2-benzoxazole)-β-(1-methyl-2-3′-sulphopropylthio-3-indolyl) - trimethincyanine hydroxide A mixture of 3-isopropylidene-1-methyl-2-thioindoline (1.0 g.), 3,6-dimethyl-2-thiobenzoxazoline (3.6 g.), and 1,3-propanesultone (5.0 ml.) was fused at 120–125° for 3½ hours, and the resulting melt was refluxed with pyridine (20 ml.) for 1 hour. Treatment of the cooled product with dilute aqueous ammonia caused the separation of a solid, which was collected and washed successively with hot water, hot benzene, and ether. Crystallisation of the residual solid from ethanol gave the dye as red needles, M.P. 291–292° (decomp.).

The dye extends the sensitivity of a silver iodobromide photographic emulsion to 5900 A. with a maximum at 5600 A.

Example 4.—Anhydro-bis-(3,5,6 - trimethyl - 2 - benzoxazole)-β-(1-methyl-2,3-sulphopropylthio-3 - indolyl)-trimethincyananine hydroxide The dye was prepared similarly to Example 3, using 3,5,6-trimethyl-2-thiobenzoxazoline, and formed red crystals, M.P. 317–318° (decomp.) by crystallisation from ethanol.

The dye extends the sensitivity of a silver iodobromide photographic emulsion to 5850 A. with a maximum at 5600 A.

Example 5.—Anhydro-bis-(6-chloro-3-methyl-2 - benzothiazole-β-(1-methyl-2-3′-sulphopropylthio-3 - indolyl)-trimethincyanine hydroxide A mixture of 6-chloro-3-methyl-2-[2-(1-methyl-2-thio-3-indolinylidene)-propylidene]-benzothiazoline (0.5 g.) and 1,3-propanesultone (0.6 ml.) was heated at 140° for 2 hours, and the cooled melt was washed several times with dry ether. This product was refluxed in ethanol (20 ml.) with 6-chloro-3-methyl - 2 - methylthiobenzothiazolium toluene-p-sulphonate (0.70 g.) and triethylamine (0.5 ml.) for 30 minutes. The solid which separated on cooling was collected, washed with cold ethanol, and boiled out with methanol to yield the dye as deep green crystals, M.P. 324–325° (decomp.).

The dye extends the sensitivity of a silver iodobromide photographic emulsion to 6450 A. with a maximum at 6300 A.

Example 6.—Anhydro-(6-chloro-3-methyl-2 - benzothiazole) (5,6-dimethoxy-3-methyl-2-benzothiazole)-β - (1-methyl-2,3′-sulphopropylthio - 3 - indolyl) - trimethincyanine hydroxide The method of Example 5 was used, with 5,6-dimethoxy-3-methyl-2-methylthiobenzothiazolium toluene-p-sulphonate (0.7 g.). The dye was precipitated by the addition of a little dilute aqueous ammonia, and formed bronze-purple crystals, M.P. 255–260°, by crystallisation from ethanol.

The dye extends the sensitivity of a silver iodobromide photographic emulsion to 6600 A. with a maximum at 6250 A.

Example 7.—Anhydro-(3-methyl-2-benzothiazole)(5,6-dimethoxy-3-methyl-2-benzothiazole)-β-(1-methyl-2 - 3'-sulphopropylthio-3-indolyl) - trimethincyanine hydroxide A mixture of 5,6-dimethoxy-3-methyl-2-[2-(1-methyl-2-thio-3-indolinylidene)-propylidene]-benzothiazoline (0.7 g.), 1,3-propanesultone (0.3 ml.), and chloroform (25 ml.) was refluxed for 2 hours, the solvent was evaporated off, and the residue was washed repeatedly with dry ether. This material was refluxed for 1 hour in ethanol (25 ml.) with 3-methyl-2-methylthiobenzothiazolium toluene-p-sulphonate (0.9 g.) and triethylamine (0.7 ml.). The cooled solution was treated with a little dilute aqueous ammonia, and the solid which separated was collected, washed with water, and boiled out with methanol to yield the dye, M.P. 294–296°.

The dye extends the sensitivity of a silver iodobromide photographic emulsion to 6750 A. with a maximum at 6500 A.

Example 8.—Anhydro - bis - (5,6-dimethoxy-3-methyl-2-benzothiazole) β - (1-methyl-2-3'-sulphopropylthio-3-indolyl)-trimethincyanine hydroxide The dye was prepared as in Example 7, but using 5,6-dimethoxy-3-methyl-2-benzothiazolium toluene-p-sulphonate (1.0 g.), and was obtained as deep purple crystals, M.P. 225–226°, by crystallisation from methanol.

The dye extends the sensitivity of a silver iodobromide photographic emulsion to 6750 A. with a maximum at 6600 A.

Example 9.—Anhydro - (3-methyl-2-benzothiazole)(3,6-dimethyl-2-benzoxazole) β - (1-methyl-2-3'-sulphopropylthio-3-indolyl)-trimethincyanine hydroxide A mixture of 3-methyl-2-[2-(1-methyl-2-thio-3-indolinylidene)-propylidene]-benzothiazoline (0.9 g.), 3,6-dimethyl-2-thiobenzoxazoline (0.9 g.) and 1,3-propanesultone (2.5 ml.) was fused at 140° for 1 hour, and the melt was then refluxed for 1 hour with pyridine (10 ml.). The product was diluted with water, and the solid was filtered off and washed with boiling water to leave the dye, which formed purple-grey crystals, M.P. 314–315° after boiling out with methanol.

The dye extends the sensitivity of a silver iodobromide photographic emulsion to 6300 A. with a maximum at 5900 A.

Example 10.—Anhydro - (3-methyl-2-benzothiazole)(6-methoxy-3-methyl-2-benzothiazole) β - (1-methyl-2-3'-sulphopropylthio-3-indolyl) - trimethincyanine hydroxide.

The dye was prepared as in Example 9, but using 6-methoxy-3-methyl-2-thiobenzoxazoline, and formed purple crystals, M.P. 309–310° after boiling out with methanol.

The dye extends the sensitivity of a silver iodobromide photographic emulsion to 6350 A. with a maximum at 6000 A.

Example 11.—Anhydro-bis - (6-methoxy-3-methyl-2-benzothiazole β - (1-methyl-2-3'-sulphopropylthio-3-indolyl)-trimethincyanine hydroxide A mixture of 6-methoxy-3-methyl-2-[2-(1-methyl-2-thio-3-indolinylidene)-propylidene]-benzothiazoline (0.54 g.), 1,3-propanesultone (0.4 ml.), and chloroform (25 ml.) was refluxed for 2½ hours, the solvent was evaporated off, and the residue was washed several times with dry ether. This product and 6-methoxy-3-methyl-2-methylthiobenzothiazolium toluene-p-sulphonate (0.9 g.) were refluxed in ethanol (25 ml.) containing triethylamine (0.7 ml.) for 45 minutes. The dye which separated was collected, washed with ethanol, and boiled out with methanol, when it formed bronze crystals, M.P. 317–318°.

The dye extends the sensitivity of a silver iodobromide photographic emulsion to 6650 A. with a maximum at 6200 A.

Example 12.—Anhydro - (6-methoxy-3-methyl-2-benzothiazole)(3-methyl-2-benzothiazole) β-(1-methyl-2-3'-sulphopropylthio - 3 - indolyl)-pentamethincyanine hydroxide 6-methoxy-3-methyl-2 - [2 - (1 - methyl-2-thio-3-indolinylidene)-propylidene]-benzothiazoline (0.95 g.) was reacted with 1,3-propanesultone as in Example 11, and the product was refluxed in ethanol for 25 minutes with 2-ω-ethylthiovinyl-3-methylbenzothiazolium toluene-p-sulphonate (1.0 g.) and triethylamine (0.8 ml.). The dye which separated was filtered off and boiled out successively with ethanol and methanol, when it formed blue-green crystals, M.P. 206–207° (decomp.).

The dye imparts a new band of sensitivity to a silver iodobromide photographic emulsion from 6800 to 8200 A. with maxima at 7300 and 7900 A.

Example 13.—Anhydro-(3-methyl-2-benzothiazole)(1,3,-3-trimethyl-2-indole) β - (1-methyl-2-3'-sulphopropylthio-3-indolyl)-pentamethincyanine hydroxide A mixture of 3-methyl-2-[2-(1-methyl-2-thio-3-indolinylidene)-propylidene]-benzothiazoline (0.70 g.) and 1,3-propanesultone (2.5 ml.) was heated at 100° for 1½ hours, and the cooled melt was washed several times with dry ether. The product, 2-ω-acetanilidovinyl-1,3,3-trimethylindolium iodide (0.90 g.), pyridine (10 ml.) and piperidine (0.4 ml.) were refluxed together for 10 minutes, the cooled mixture was filtered, and the filtrate was diluted with water. The solid which slowly separated was collected, washed with water, and crystallised from ethanol to give the dye as bronze crystals, M.P. 233–234°.

The dye imparts a new band of sensitivity to a silver iodobromide photographic emulsion from 6700 to 7700 A. with a maximum at 7400 A.

Example 14.—Anhydro-(3-methyl-6-phenyl-2-benzothiazole)(6-methoxy-3-methyl-2-benzothiazole) β-(1-methyl - 2-3'-sulphopropylthio-3-indolyl) - trimethincyanine hydroxide A mixture of 3-methyl-2-[2-(1-methyl-2-thio-3-indolinylidene) - propylidene]-6-phenylbenzothiazoline (0.85 g.) and 1,3-propanesultone (0.8 ml.) was heated at 90–100° for 3 hours, and the cooled product was washed several times with dry ether. The residue was refluxed for 1 hour in ethanol (25 ml.) with 6-methoxy-3-methyl-2-methylthiobenzothiazolium toluene-p-sulphonate (0.9 g.) and triethylamine (0.7 ml.). After cooling to 0°, the solid which separated was collected and crystallised as purple crystals, M.P. 265–268°. The dye extends the sensitivity of a silver iodobromide photographic emulsion to 6700 A. with a maximum at 6200 A.

Example 15.—Anhydro-(3-methyl-6-phenyl-2-benzothiazole)(5,6-dimethoxy-3-methyl-2-benzothiazole) β - (1-methyl - 2-3'-sulphopropylthio-3-indolyl) - trimethincyanine hydroxide A similar method to Example 14 was employed, but using 5,6 - dimethoxy-3-methyl-2-methylthiobenzothiazolium toluene-p-sulphonate. The dye was obtained as deep purple crystals, M.P. 245–250°, by crystallisation from methanol.

The dye extends the sensitivity of a silver iodobromide photographic emulsion to 6850 A. with a maximum 6300 A.

Example 16.—Anhydro - (3-methyl-2-benzothiazole)(6-methoxy-3-methyl-2-benzothiazole) β - (1-methyl-2-4'-sulphobutylthio-3-indolyl)-trimethincyanine hydroxide A mixture of 3-methyl-2-[2-(1-methyl-2-thio-3-indolinylidene)-propylidene]-benzothiazoline (0.7 g.) and 1,4-butanesultone (2.0 ml.) was heated at 140° for 2 hours, and the cooled melt was washed with several portions of dry ether. A solution of the product in ethanol (20 ml.) was refluxed for 1 hour with 6-methoxy-3-methyl-2-methylthio-benzothiazolium toluene-p-sulphonate (1.0 g.) and triethylamine (0.7 ml.). The resulting solution was treated with a little dilute aqueous ammonia, and the solid which separated was collected and crystallised from methanol. The dye formed deep green crystals, M.P. 265–267° (decomp.).

The dye extends the sensitivity of a silver iodobromide photographic emulsion to 6650 A. with a maximum at 6200 A.

Example 17.—Anhydro - (3 - methyl - 2 - benzothiazole) (6 - methoxy - 3 - methyl - 2 - benzothiazole) β - [1-methyl - 2 - (1 - methyl - 4 - sulphobutylthio) - 3-indolyl] - trimethincyanine hydroxide A method similar to Example 16 was used, except that 1,4-pentanesultone was used, and a fusion temperature of 160° for 1½ hours. The dye was obtained as bronze crystals, M.P. 240–243°, by crystallisation from aqueous ethanol.

The dye extends the sensitivity of a silver iodobromide photographic emulsion to 6500 A. with a maximum at 6250 A.

Example 18.—Anhydro - (3 - methylnaphtho[1,2d]thiazole - 2)(6 - methoxy - 3 - methyl - 2 - benzothiazole) β - (1 - methyl - 2 - 3' - sulphopropylthio-3 - indolyl) - trimethincyanine hydroxide A mixture of 3 - methyl - 2 - [2 - (1 - methyl - 2-thio - 3 - indolinylidene)propylidene]naphtho[1,2d]thiazoline (0.8 g.) and 1,3-propanesultone (2.0 g.) was heated at 90–100° for 1½ hours, and the cooled product was washed with several portions of dry ether. A solution of the product in ethanol (25 ml.) was refluxed for 20 minutes with 6 - methoxy - 3 - methyl - 2 - methylthiobenzothiazolium toluene - p - sulphonate (1.3 g.) and triethylamine (0.7 ml.). The solid which separated on cooling was collected, washed with cold ethanol, and boiled out with methanol. The dye formed deep green needles, M.P. 266–268°.

The dye extends the sensitivity of a silver iodobromide photographic emulsion to 6900 A. with a maximum at 6600 A.

By a method similar to that used in Example 18, the following Examples 19 to 22 were obtained:

Example 19.—Anhydro - (3 - methyl - 2 - benzothiazole) (6 - methoxy - 3 - methyl - 2 - benzothiazole) β - (5-methoxy - 1 - methyl - 2 - 3' - sulphopropylthio - 3-indolyl) - trimethincyanine hydroxide The dye was obtained from 2 - [2 - (5 - methoxy - 1-methyl - 2 - thio - 3 - indolinylidene) - propylidene]-3 - methyl - 2 - benzothiazoline, and formed green needles, M.P. 260–263°, by crystallisation from methanol.

The dye extends the sensitivity of a silver iodobromide photographic emulsion to 6550 A. with a maximum at 6250 A.

Example 20.—Anhydro - (3 - methyl - 2 - benzothiazole) (6 - methoxy - 3 - methyl - 2 - benzothiazole) α-methyl - β - (1 - methyl - 2 - 3' - sulphopropylthio-3 - indolyl) - trimethincyanine hydroxide The dye was obtained from 3 - methyl - 2 - [1 - methyl-2 - (1 - methyl - 2 - thio - 3 - indolinylidene) - propylidene] - benzothiazoline, and formed deep purple crystals, M.P. 323–324°, by crystallisation from methanol.

The dye extends the sensitivity of a silver iodobromide photographic emulsion to 6550 A. with a maximum at 6350 A.

Example 21.—Anhydro - (3 - methyl - 2 - benzoselenazole)(6 - methoxy - 3 - methyl - 2 - benzothiazole) β - (1 - methyl - 2 - 3' - sulphopropylthio-3 - indolyl) - trimethincyanine hydroxide The dye was prepared from 3 - methyl - 2 - [2 - (1-methyl - 2 - thio - 3 - indolinylidene) - propylidene]-benzoselenazoline, and was obtained as deep purple crystals, M.P. 225–258°, by crystallisation from methanol.

The dye extends the sensitivity of a silver iodobromide photographic emulsion to 6500 A. with a maximum at 6200 A.

Example 22.—Anhydro - (6 - methoxy - 3 - methyl - 2-benzothiazole)(3 - methyl - 2 - benzothiazole) β - (1-phenyl - 2 - 3' - sulphopropylthio - indolyl) - trimethincyanine hydroxide The dye was prepared from 3 - methyl - 2 - [2 - (1-phenyl - 2 - thio - 3 - indolinylidene) - propylidene]-benzothiazoline, and formed deep green crystals, M.P. 308–309° (decomp.) by boiling out with methanol.

The dye extends the sensitivity of a silver iodobromide photographic emulsion to 6650 A. with a maximum at 6400 A.

Example 23.—Anhydro - (3 - methyl - 4,5 - diphenyl-2 - thiazole)(3 - methyl - 2 - benzothiazole) β - (1-methyl - 2 - 3' - sulphopropylthio - 3 - indolyl) - trimethincyanine hydroxide A mixture of 3 - methyl - 2 - [2 - (1 - methyl - 2-thio - 3 - indolinylidene) - propylidene] - 4,5 - diphenyl-thiazoline (0.75 g.), 1,3-propanesultone (0.3 ml.), and chloroform (25 ml.) was refluxed for 45 minutes. The residue remaining after evaporation of the solvent was refluxed for 30 minutes in ethanol (20 ml.) with 3-methyl - 2 - methylthiobenzothiazolium toluene - p-sulphonate (1.0 g.) and triethylamine (0.7 ml.). The dye which separated was collected after cooling, and crystallised from methanol, when it formed bronze crystals, M.P. 257–260°.

The dye extends the sensitivity of a silver iodobromide photographic emulsion to 6600 A. with a maximum at 6250 A.

Example 24.—Anhydro - bis - (3 - ethyl - 2 - benzothiazole)β - (1 - methyl - 2 - 3' - sulphopropylthio-3 - indolyl) - trimethincyanine hydroxide A mixture of 3 - ethyl - 2 - [2 - (1 - methyl - 2 - thio-3 - indolinylidene) - propylidene] - benzothiazoline (0.7 g.) and 1,3 - propanesultone (1.5 ml.) was fused at 90–100° for 30 minutes, and the melt washed by decantation with ethyl acetate. The product and 3 - ethyl - 2-ethylthiobenzothiazolium toluene - p - sulphonate (1.4 g.) were refluxed for 30 minutes in ethanol (15 ml.) with anhydrous sodium acetate (0.5 g.). The solid which separated on addition of dilute aqueous ammonia was filtered off, washed with water and ether, dried, and crystallised from methanol. The dye formed yellow-green crystals, M.P. 268–270° (decomp.).

The dye extends the sensitivity of a silver iodobromide photographic emulsion to 6450 A. with a maximum at 6200 A.

Example 25.—Anhydro - (1 - methyl - 2 - quinoline) (6 - methoxy - 3 - methyl - 2 - benzothiazole)β - (1-methyl - 2 - 3' - sulphopropylthio - indolyl - trimethincyanine hydroxide A mixture of 6 - methoxy - 2 - [2 - (1 - methyl - 2-thio - 3 - indolinylidene)propylidene] - benzothiazoline (0.5 g.) and 1,3 - propanesultone (1.0 ml.) was heated at 90–100° for 15 minutes. The resulting melt was stirred with ethyl acetate, and the solid which separated was collected and washed with ethyl acetate. This product and 1 - methyl - 2 - methylthioquinolinimum iodide (0.6 g.) were refluxed for 30 minutes in ethanol (20 ml.) containing triethylamine (0.4 ml.), and the solution was added to dilute aqueous ammonia. The tar which separated was stirred with ether, when it hardened. The resulting solid was washed with water and ether, and boiled out with methanol, giving the dye as green crystals, M.P. 321–322° (decomp.).

The dye imparts a new band of sensitivity to a silver iodobromide photographic emulsion from 5900 to 7000 A. with a maximum at 6600 A.

I claim as my invention:

1. A process for the production of a dye of the formula:

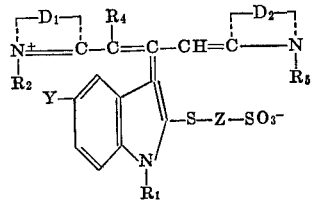

wherein $R_1$ is selected from the class consisting of methyl and phenyl groups, $R_2$ and $R_5$ are each selected from the class consisting of methyl and ethyl, $R_4$ is selected from the class consisting of hydrogen and methyl groups, Y is selected from the class consisting of hydrogen and methoxy groups, Z is a saturated alkylene group of 3 to 5 carbon atoms linking the indicated sulphur atoms, and $D_1$ and $D_2$ are each a residue selected from the residues of thiazole, benzthiazole, benzoxazole, benzselenazole, naphthathiazole and indole, which comprises fusing a first compound of the formula:

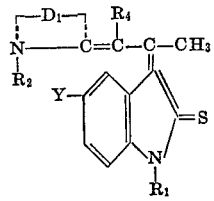

with a theoretical excess based on the said first compound of a compound of formula:

and a compound of formula:

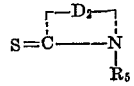

wherein the symbols have the meanings just assigned and refluxing the product in the presence of a basic condensing agent.

2. A process for the production of a dye of the formula:

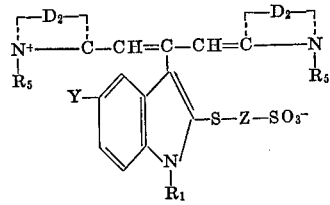

wherein $R_1$ is selected from the class consisting of methyl and phenyl groups, $R_5$ is selected from the class consisting of methyl and ethyl groups, Y is selected from the class consisting of hydrogen and methoxy groups, Z is a saturated alkylene group of 3 to 5 carbon atoms linking the indicated sulphur atoms, and $D_1$ and $D_2$ are each a residue selected from the residues of benzthiazole, benzoxazole and benzselenazole which dye is symmetrical in structure, which comprises fusing a first compound of the formula:

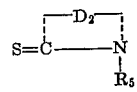

with an excess based on the said first formula of a compound of the formula:

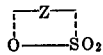

and with a compound of the formula:

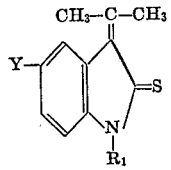

wherein the symbols have the meanings just assigned, and refluxing the product in the presence of a basic condensing agent.

References Cited

FOREIGN PATENTS 845,588   8/1960   Great Britain.

JOHN D. RANDOLPH, *Primary Examiner.*

H. I. MOATZ, *Assistant Examiner.*